United States Patent [19]

Taylor

[11] 4,151,977

[45] * May 1, 1979

[54] OCEAN THERMAL ENERGY CONVERSION VALVE

[76] Inventor: Julian S. Taylor, 8300 SW. 8, Oklahoma City, Okla. 73108

[*] Notice: The portion of the term of this patent subsequent to Jun. 13, 1995, has been disclaimed.

[21] Appl. No.: 882,471

[22] Filed: Mar. 1, 1978

Related U.S. Application Data

[63] Continuation-in-part of Ser. No. 809,345, Jun. 23, 1977, Pat. No. 4,094,334.

[51] Int. Cl.² ............................................. F16K 31/12
[52] U.S. Cl. .................................. 251/11; 137/236 S; 251/324
[58] Field of Search ................ 137/219, 236; 166/332; 251/11, 294, 339, 324

[56] References Cited

U.S. PATENT DOCUMENTS 4,094,334  6/1978  Taylor ............................... 251/11 X

*Primary Examiner*—Gerald A. Michalsky
*Attorney, Agent, or Firm*—Robert K. Rhea

[57] ABSTRACT

A fluid flow control valve to be interposed in the fluid passageway of a large diameter casing projecting downwardly below the ocean thermocline for moving cold water to the surface. The depending end portion of the casing wall is provided with inlet ports. A sleeve valve, having a length at least greater than the vertical limit of the ports, is coaxially disposed in the casing and includes spaced-apart upper and lower floatation chambers slidably contacting the casing inner wall surface for opening and closing the passageway. Inflatable seals, surrounding and supported by the floatation chambers, are selectively inflated or deflated. The floatation chambers also are selectively inflated or deflated to provide or remove buoyancy of the sleeve valve in its passageway opening and closing action. Stops, secured to the inner wall surfaces of the casing above the upper limit of the ports, prevent upward movement of the sleeve valve beyond a passageway closed position.

3 Claims, 5 Drawing Figures

OCEAN THERMAL ENERGY CONVERSION VALVE

CROSS REFERENCE TO RELATED APPLICATION

This application is a continuation-in-part of an application filed by me in the U.S. Patent and Trademark Office on June 23, 1977, Ser. No. 809,345 for OCEAN THERMAL CONVERSION VALVE, now U.S. Pat. No. 4,094,334.

BACKGROUND OF THE INVENTION

1. Field of the Invention

The present invention relates to large diameter gate valves and remote control thereof in an opening and closing action.

It has been proposed to harness ocean thermal energy by utilizing an economic nonpolluting power source comprising a heat engine which uses warm ocean surface water as the heat source and the cold subsurface water as a heat sink for converting thermal energy to electrical energy. From an economical point of view it is necessary that a bank of such heat engines be operated to justify the cost of installation and operation thus requiring a relatively large volume of cold sea water to be pumped to the surface for cooling or condensing a gas after driving a turbine for recirculation and vaporization of the gas by warm ocean surface water for again driving the turbine in an endless cycle. A proposed diameter of the casing, for obtaining the cold sea water, is approximately 40 feet (12.20 meters). Since the large diameter casing must extend downwardly into the ocean a depth of 1500 feet (457.20 meters) or more some means must be provided in the depending end portion of the casing for opening and closing its passageway.

2. Description of the Prior Art

The prior art, such as U.S. Pat. No. 2,759,699 and British Pat. No. 653,266 (5—1951), has generally comprised sleeve valves capable of opening and closing a fluid passageway or conductor by fluid pressure applied to a hydraulic type cylinder forming a part of or secured to the valve.

This invention is distinctive over this type of valve control by providing a floatation ring equipped sleeve valve which is balanced with respect to fluid pressure or a hydrostatic head thereagainst which is opened and closed by inflating and deflating floatation chambers forming a part of the sleeve valve.

This invention is distinctive over my copending application by eliminating the jacket surrounding the casing ports and the continuation of the casing string beyond the valve and further by confining the sleeve valve within the ported end portion of the casing.

SUMMARY OF THE INVENTION

The depending end of a submerged vertically disposed casing is coaxially connected with an equal diameter tube having a bottom end wall closing the casing passageway. The tube is provided with a plurality of wall ports, at least equal in area to its transverse cross section area, spaced upwardly from its closed end.

A sleeve valve comprising an elongated open end sleeve, having a length at least greater than the vertical extent of the tube ports, is coaxially disposed within the tube. A hollow ring member horizontally surrounds the depending end portion of the sleeve and forms a lower floatation chamber. A conical-shaped upper ring member, having an altitude slightly less than the vertical limit of the wall ports, surrounds the upper end portion of the sleeve to form an upper floatation chamber. The spacing between the ring members being at least slightly greater than the vertical limit of the tube ports. An inflatable seal, nested by a recess in the periphery of each of the ring members, forms a fluid tight seal, when inflated, with the inner wall surface of the tube. Flexible tubing, extending downwardly through the passageway of the casing and the sleeve, supplies air pressure for inflating the seals and exhausting water out of the floatation chambers to provide buoyancy for raising and lowering the sleeve valve. Stops on the inner surface of the tube prevent movement of the sleeve valve out of the tube.

It is, therefore, the principal object of this invention to provide an ocean thermal energy conversion valve to be interposed in the fluid passageway of a large diameter casing which is opened and closed by remote control.

DESCRIPTION OF THE PREFERRED EMBODIMENT

Figure 2:
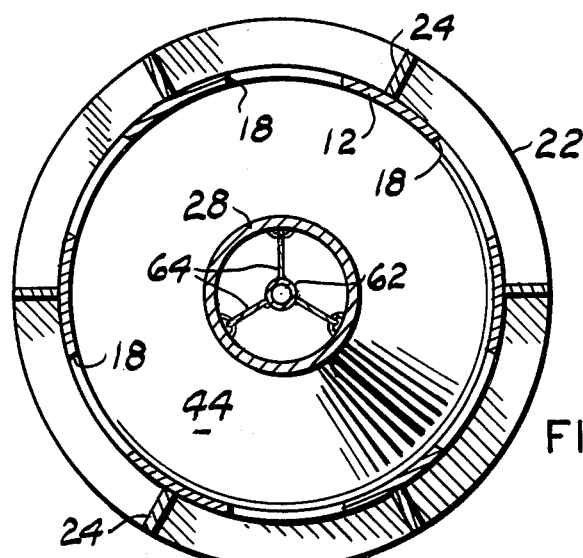
FIG. 2 is a horizontal cross sectional view, partially in elevation, taken substantially along the line 2—2 of FIG. 1.
Figure 1:
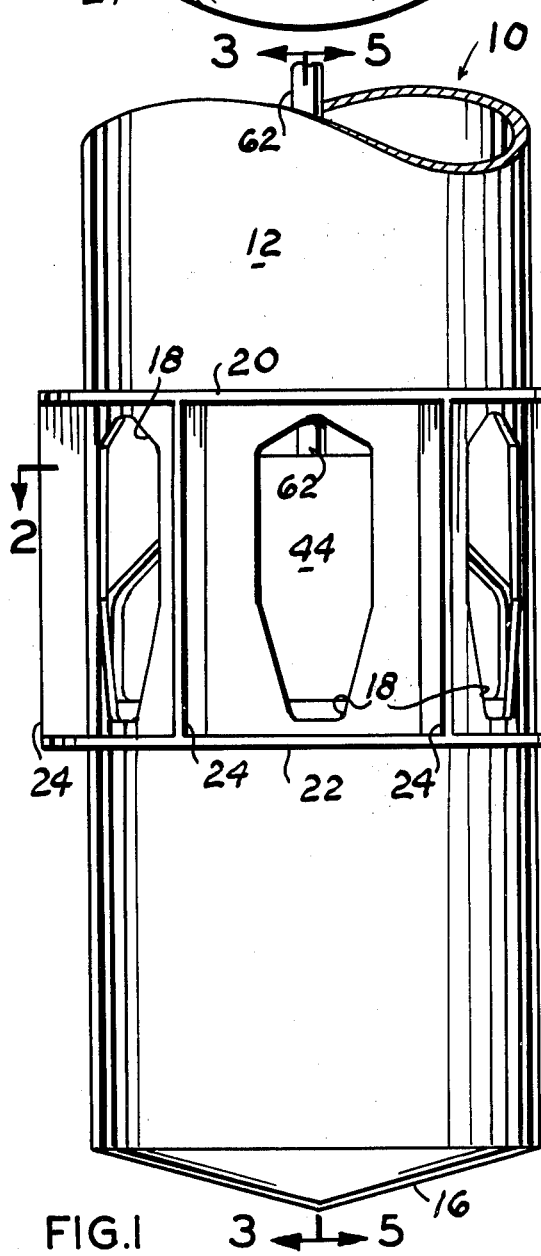
FIG. 1 is a fragmentary elevational view of the depending end portion of a casing having the valve installed therein.
Figure 5:
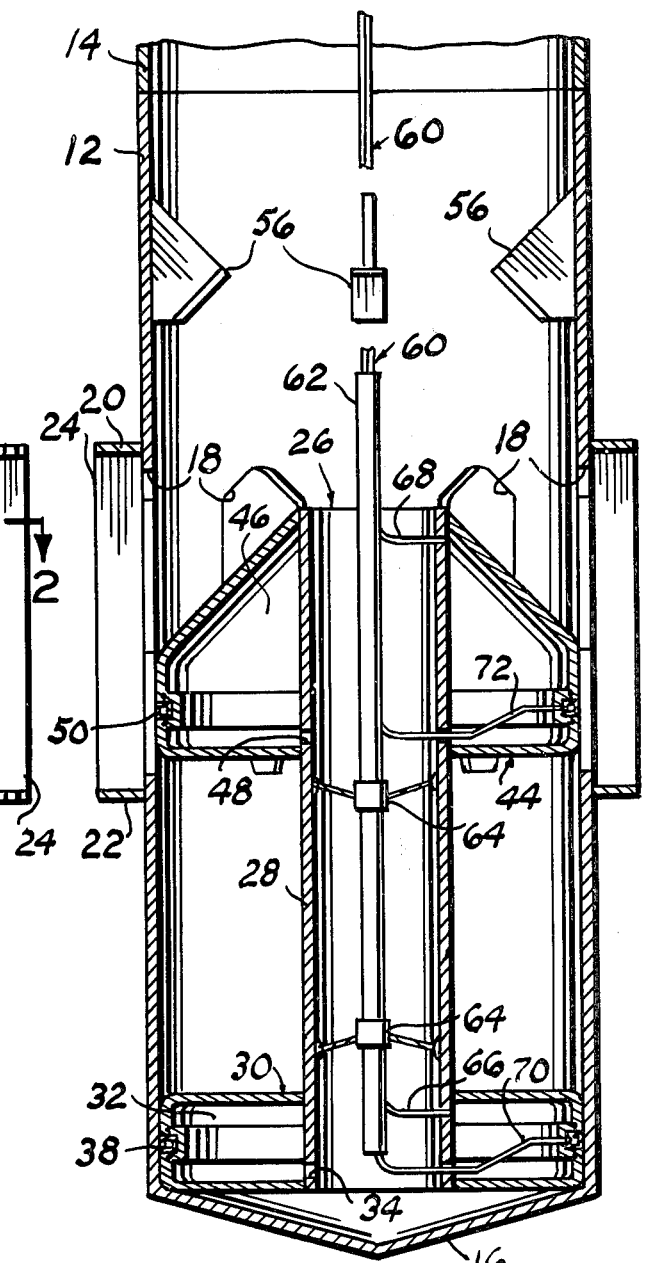
FIG. 5 is a vertical cross sectional view, partially in elevation, taken substantially along the line 5—5 of FIG. 1.

Like characters of reference designate like parts in those figures of the drawings in which they occur.

In the drawings:

The reference numeral 10 indicates the valve, as a whole, which is generally cylindrical in side elevation. The valve 10 includes a length of casing or tube 12 preferably diametrically equal and integral with or coaxially connected at its upper end with the depending end of a submerged fluid conducting large diameter casing 14. The depending end of the tube 12 is closed by an end wall 16. The tube 12 is provided, intermediate its ends, with a plurality of circumferentially spaced wall ports 18. In the example shown, the ports 18 are vertically elongated but obviously may be of any desired configuration as long as the combined area encompassed thereby is at least equal to and preferably exceeds the transverse area of the tube or casing 14 for the reasons readily apparent.

The tube 12 is surrounded by upper and lower generally horizontally disposed flat rings 20 and 22 respectively disposed above and below the upper and lower limits of the ports 18. The rings 20 and 22 are interconnected by a plurality of equally spaced-apart vanes 24, each vane being centrally disposed between adjacent ports 18 for directing fluid into and through the ports as, for example, when the valve is disposed within a current. Obviously, the respective portions of the rings and vanes surrounding each port may form a part of or be connected with tubular members, not shown, extending generally laterally from the tube.

Sleeve valve means 26 opens and closes the ports 18. The sleeve valve means 26 comprises an open end sleeve 28 coaxially disposed within the tube 12. The length of the sleeve 28 is preferably at least twice the vertical height of the tube ports 18 for the reasons believed readily apparent.

Adjacent its depending end, the sleeve 28 is horizontally surrounded and connected with a hollow ring member 30 forming a floatation chamber 32 having a drain port 34 in the sleeve wall. The ring member 30 is provided with a circumferential recess 36 (FIG. 6) for receiving an inflatable O-ring type lower seal 38 for the purposes presently explained.

Figure 6:
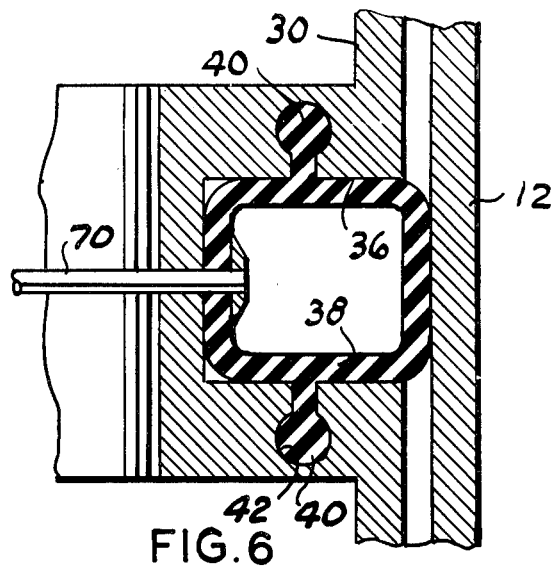
FIG. 6 is a fragmentary vertical cross sectional view, to an enlarged scale, taken substantially along the line 6—6 of FIG. 4; and, FIG. 7 is a fragmentary vertical cross sectional view, to an enlarged scale, taken substantially along the line 7—7 of FIG. 3.
Figure 7:
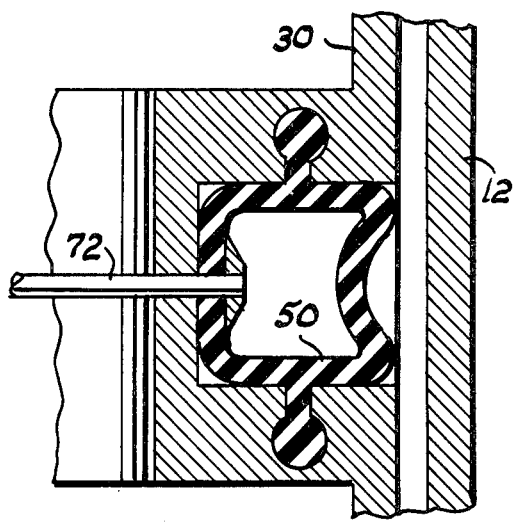

As clearly shown by FIGS. 6 and 7, the seal 38 is substantially square in transverse section having opposing coextensive anchor wings or tabs 40 nested by cooperating recesses 42 for securing the seal 38 in place and preventing a friction induced rolling action on the seal when the seal is moved relative to the inner wall surface of the tube 12, as presently explained.

Figure 3:
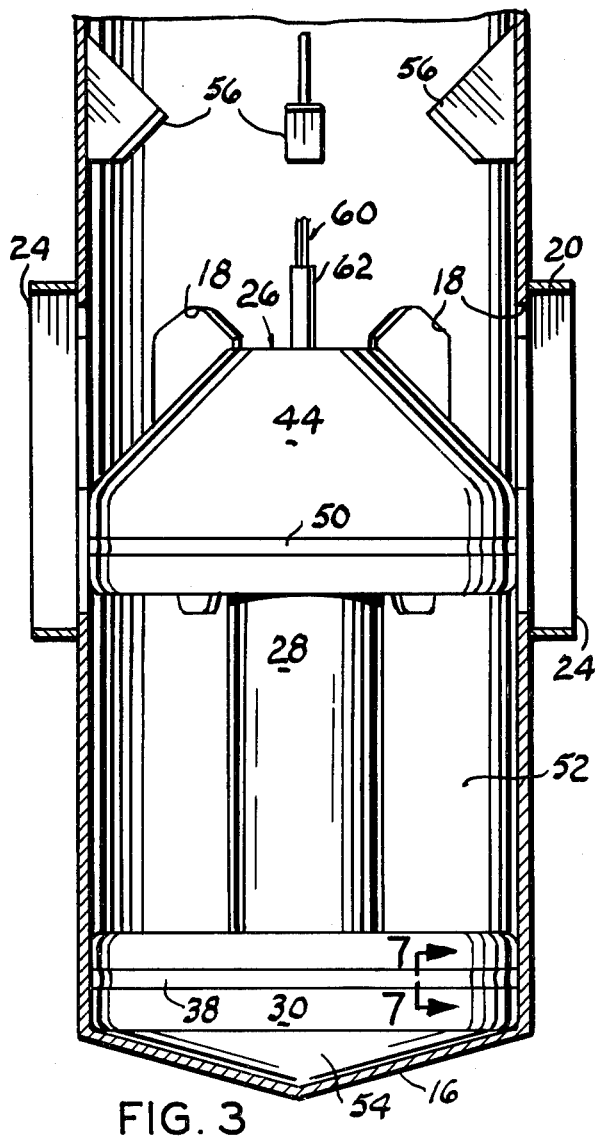
FIG. 3 is a vertical cross sectional view, partially in elevation, taken substantially along the line 3—3 of FIG. 1 illustrating the sleeve valve in open position.
Figure 4:
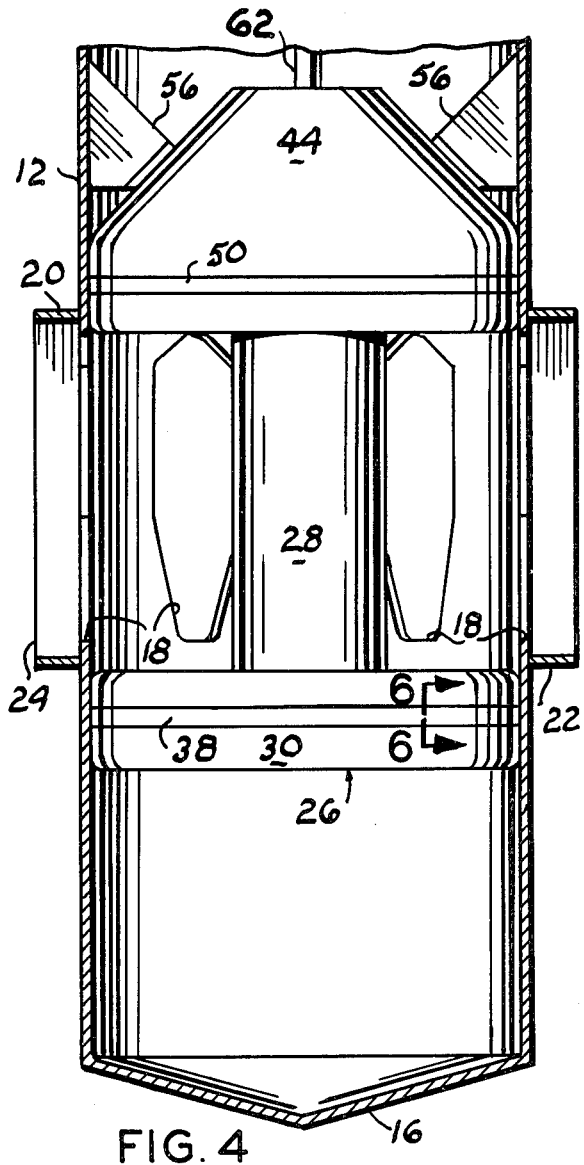
FIG. 4 is a view similar to FIG. 3 illustrating the valve in closed position.

The upper end portion of the sleeve 28 is surrounded and connected with a hollow substantially truncated conical member 44 having a vertical height slightly less than the vertical limit of the wall ports 18 and forming an upper floatation chamber 46 similarly having a drain port 48 in the sleeve wall. The periphery of the depending end portion of the conical shaped member 44 is similarly provided with an annular groove for receiving a second O-ring type upper seal 50. The spacing between the depending limit of the conical shaped member 44 and the upper limit of the ring member 30 is at least greater than the vertical extent of the tube ports 18 so that when the sleeve valve 26 is disposed in port closed position, the position of the respective seals 38 and 50, surrounding the floatation chambers 30 and 44, will respectively be disposed below and above the lower and upper limit of the tube ports 18 (FIG. 4). When the sleeve valve 26 is disposed in port open position (FIG. 3), the lower floatation chamber 30 is disposed adjacent the closed end 16 of the tube and the depending limit of the upper floatation conical shaped member 44 is above the lower limit of the ports 18 so that fluid, not shown, may enter the annulus 52 within the tube 12 around the sleeve 28. The purpose of the open end sleeve is to permit the fluid to enter the spacing 54 below the lower floatation ring 30 thus balancing the valve 26 with respect to hydrostatic pressure.

Upward movement to a port closed position of the sleeve valve means 26 is limited by a plurality of stops 56 secured to the inner wall surface of the tube 12. Movement of the valve means 26 from a port open position, as shown by FIG. 3, to the port closed position shown by FIG. 4, is accomplished by displacing the fluid contained by the floatation chambers 32 and 46 with air. This is accomplished by a plurality of air lines 60 extending from the ocean surface downwardly through the casing 14 and the tube 12. The air lines 60 are supported within the sleeve 28 by an open end conduit 62 secured by brace members 64 to the inner wall surface of the sleeve 28. Two of the air lines 66 and 68 are connected with the upper limit of the respective floatation chambers 30 and 46 for exhausting water contained thereby, when the valve means 26 is in port open position, outwardly through the sleeve ports 34 and 48. A second pair of air lines 70 and 72 are connected with the respective seals 38 and 50 for inflating the seals to seal with the inner wall surface of the tube 12, as clearly illustrated in FIG. 6. FIG. 7 illustrates the relaxed position of the seals when the sleeve valve is in port open position.

OPERATION

In operation, the sleeve valve means 26 is normally disposed in the position shown by FIG. 3 which permits fluid flow through the ports 18, the passageway of the tube 12 and the casing 14. In this position the chambers 42 and 46 normally contain fluid which enters through the drain ports 34 and 48. When it is desired to close the valve air under pressure is supplied to the chambers 32 and 46 through the air lines 66 and 68 which displaces the fluid in these chambers and provides buoyancy for lifting the valve to the position of FIG. 4. Air is then applied to the seals 38 and 50 through the air lines 70 and 72 for sealing with the inner wall surface of the tube 12 thus closing the ports 18. When the valve is to be opened air pressure within the chambers 32 and 46 is released through the tubes 66 and 68 at the ocean surface. Similarly, the seals 38 and 50 are deflated so that the sleeve valve 26 descends by gravity to the valve open position of FIG. 3, such movement being controlled by partial deflation of the seals so that they act as a brake during descent of the sleeve valve.

Obviously the invention is susceptible to changes or alterations without defeating its practicability. Therefore, I do not wish to be confined to the preferred embodiment shown in the drawings and described herein.

I claim:

1. A valve for opening and closing the fluid passageway of a casing, said casing having a closed depending end and having at least one inlet port in its wall adjacent the closed end, comprising:

sleeve valve means including an open end sleeve within said casing and upper and lower ring members surrounding and secured to said sleeve in vertically spaced relation for forming upper and lower floatation chambers each having a drain port and being slidably received by the inner wall surface of said casing, the spacing between said ring members being at least slightly greater than the vertical extent of the casing port;

sealing means carried by said upper and lower ring members for sealing fluid tight with the inner wall surface of said casing; and, control means for moving said sleeve valve means toward and away from said closed end.

2. The combination according to claim 1 in which each said sealing means includes:

a flexible inflatable endless tube-like seal.

3. The combination according to claim 2 in which said control means includes:

a plurality of air lines, connected with a source of air under greater than atmospheric pressure, extending through said casing and connected respectively with each said floatation chamber and said seal; and, stop means connected with said casing for limiting movement of said sleeve valve means away from said closed end beyond a predetermined position.

* * * * *